May 17, 1955 — F. SPARR — 2,708,735

TESTER FOR BATTERIES AND BULBS

Filed Sept. 5, 1951 — 2 Sheets-Sheet 1

INVENTOR.
Frank Sparr
BY Kenyon & Kenyon
ATTORNEYS

May 17, 1955  F. SPARR  2,708,735
TESTER FOR BATTERIES AND BULBS
Filed Sept. 5, 1951  2 Sheets-Sheet 2
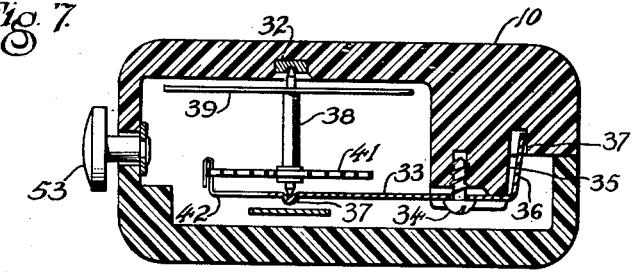
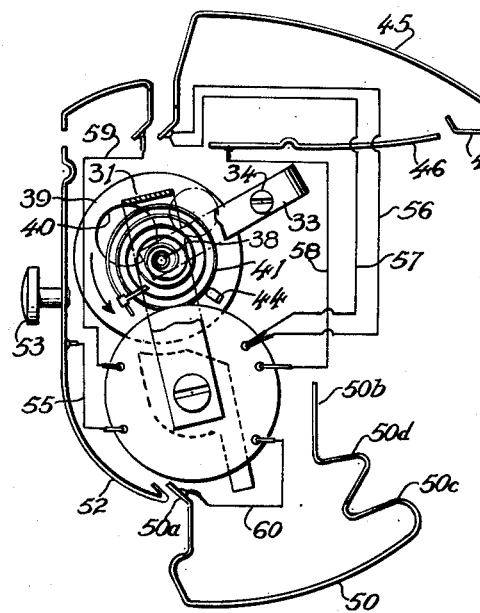
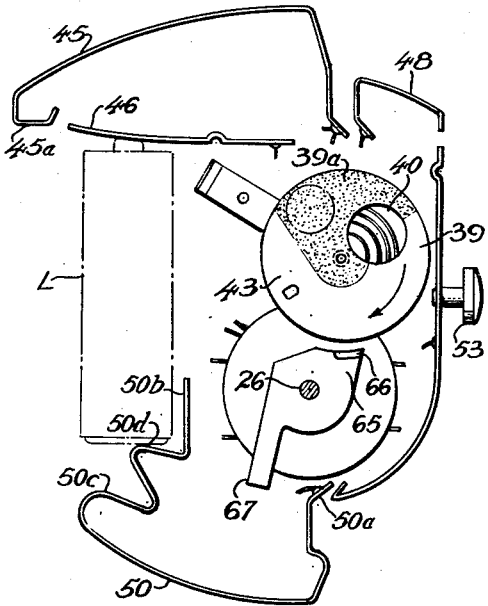
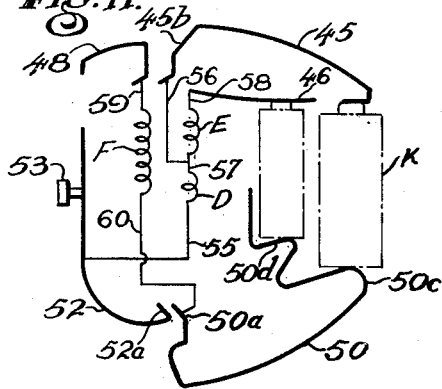
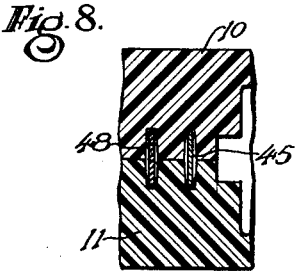
INVENTOR.
Frank Sparr
BY Kenyon & Kenyon
ATTORNEYS

United States Patent Office 2,708,735
Patented May 17, 1955

2,708,735
TESTER FOR BATTERIES AND BULBS

Frank Sparr, Bellerose, N. Y., assignor to Bright Star Battery Company, Clifton, N. J., a corporation of New Jersey Application September 5, 1951, Serial No. 245,118

11 Claims. (Cl. 324—29.5)

This invention relates to testers for all types of batteries and bulbs.

Small cells used in flashlights and similar equipment come conventionally in several sizes (e. g. standard, medium and pen-light.) An object of this invention is to provide a conveniently-carried pocket-type tester which is useful for testing any of the present commercially available conventionally-sized cells to ascertain whether the cell charge is sufficient for further use of the cell under test.

A further object of this invention is to provide a tester of this type which need not be recalibrated for testing of differently sized conventional cells but which after initial calibration at the time of its manufacture requires no further calibration on the part of the tester regardless of the size of the conventional cell under test.

Still another object of the invention is to provide a tester which may also be used with cells of the character described for the testing of flash bulbs to determine whether the latter will fire or not.

Further objects of the invention include the provision of comparatively simple construction in the tester that render it easy to manufacture and assemble, and easy to operate.

Other objects and novel features of the invention will become apparent from the following specification and accompanying drawings wherein:

Fig. 7 is a fragmentary section, viewed in the direction of the arrows, taken along line 7—7 of Fig. 4;

Fig. 8 is a fragmentary section, viewed in the direction of the arrows taken along line 8—8 of Fig. 4;

Fig. 9 is a schematic illustration of contact parts in relationship to electric circuits involved in the tester;

Fig. 10 is a similar schematic illustration of contact and operating parts in relationship to electric circuits involved viewed from the reverse side of Fig. 9; and Fig. 11 is a diagrammatic showing of circuits involved in the tester.

Figure 2:
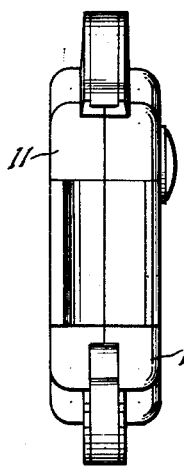
Fig. 2 is a left side elevation of the tester of Fig. 1.

Referring to the drawing, the battery tester comprises generally a hollow two part casing C of suitable material and preferably a molded plastic composition which is separable along a central line of cleavage at its side edges into a front shell part 10 and a rear shell part 11. A wing part 12 preferably formed integrally with the front shell part 10 extends from the upper wall and laterally beyond one side wall of the said shell part 10. An identical wing part 13 preferably formed integrally with the rear shell part and of identical shape and similarly located extends from the upper wall and laterally beyond the corresponding side wall of the rear shell part 11. The two wing parts 12 and 13 in assembly provide an upper wing 14 extending laterally of the left side walls of the assembled casing parts 10 and 11 for purposes presently to be described.

A wing part 15 preferably also integral with the front shell part 10 extends from its bottom wall and laterally beyond the same side wall of said shell part 10 as wing part 12 but to a lesser extent. A similar wing part 16 of identical shape similarly extends from the bottom wall of rear shell part 11. The two wing parts 15 and 16 in assembly provide a lower ring 17 extending laterally of the left side walls of the assembled casing shell parts 10 and 11, also, for purposes presently to be described. In assembly, the facing edges of the walls of the shell parts 10 and 11 abut each other and the two parts are secured together in assembled relationship as by eyelets 18 or by adhesives or in any convenient way.

The front shell part has a hole 19 in which a window 20 of clear plastic or other transparent material is fixed. A vertical indicator line 21 is etched or otherwise marked in the window 20 for purposes presently to be described. A lens 22 is secured over the front of the hole 19 as by a bezel 23.

A metal bushing 24 is fixed permanently in the front wall of shell part 10 facing inwardly thereof and has a threaded hole 25 for mounting a screw 26 which supports a steel core 27. Coils of insulated electric wire D, E and F (Fig. 11) are wound conveniently on the core 27 between bobbin end discs 28 and 29. These coils which have different numbers of turns are connected in electric circuits for purposes presently to be described.

An armature 30 of steel or other magnetic material in magnetic contact with the core 27 is supported by the screw 26 and extends radially relative to the bobbin end disc 29. This armature has a laterally bent over outer end portion 31.

A bearing 32 (Fig. 7) is mounted permanently in the wall of part 10 facing inwardly thereof. An arm 33 is secured by a screw 34 to the portion 35 of the front shell part 10. This arm has a laterally bent over end portion 36 that extends into a receiving recess 37 in the part 10 to prevent pivotal rotation of the arm 33. This arm 33 has a bearing 37 aligned with the bearing 32. The two bearings rotatively support a pivot shaft 38 between them.

An indicator disc 39 preferably circular in shape is mounted on the shaft 38 its center being slightly offset from concentricity with the axis of pivot shaft 38 as seen in Fig. 10. This disc 39 is of steel or other magnetic material and is so positioned on shaft 38 that it lies in proximity to the outer end of portion 31 of the armature 30. The disc 39 has a hole 40 so as to lighten one of its diametrical halves for weight biasing purposes. Also, a biasing hair spring 41 has one end fixed to the shaft 38 and its other end fixed adjustably to the spring connector 42 which is secured to the arm 33. A portion 43 of the surface of the disc 39 is colored with a light color as green. The balance 39a of the surface of disc 39 is of dark shade.

A prong 44 (Fig. 9) extending upwardly from the surface of the disc 39 is engageable with the edge of the bobbin end disc 28 to limit rotation of the disc 39. The biasing action of hair spring 41 as well as the eccentric mounting of disc 39 on shaft 38 and the weighting resulting from provision of hole 40 in said disc acts normally to maintain the colored portion 43 of the disc out of registry with the window 20. The disc 40 other than its colored portion 43 is preferably dark in shade so that the colored portion 43 when appearing in front of the window 20 will be visible clearly therethrough in contrast with the darker shade balance of the said disc.

A metallic contact element 45 is wrapped around a portion of the peripheral walls of wing 14 having a bent over portion 45a underlying the forward or outer portion of the bottom peripheral wall of wing 14. This contact element part 45a, as will be described, is to make contact with the positive or central rod electrode of a cell to be tested. A second contact element 46 is positioned in parallelism with a second portion of the peripheral wall of wing 14 being separated from the portion 45a of the contact element 45 by a spacer flange 47 integral with the wing parts 12 and 13. Appropriate recesses are provided in the abutting edges of side wall surfaces of the two shell parts 10 and 11 to receive the opposite side edges of these contact elements 45 and 46. The contact element 46 as will be described is to make contact with the positive or central rod electrode of a differently sized cell to be tested.

A third contact element 48 for bulb testing purposes, as will be described, is mounted on a portion of the peripheral walls of the shell parts 10 and 11 in proximity to and being spaced from contact element 45 by an integral projection 49 formed on the shell parts 10 and 11.

The lower wing 17 supports a spring contact member 50. This spring contact member at one end 50a projects inwardly through slotted openings in the shell parts 10 and 11. The opposite end 50b of the contact 50 is movably engageable in slotted recesses 51 provided in the abutting faces of the walls of shell parts 10 and 11. Intermediate its ends the spring contact member 50 has a pair of step like portions 50c and 50d, the first of which underlies the outer end of contact portion 45a and the second of which underlies the contact 46. This spring contact member 50 is displaceable relative to its fixed end 50a, and being spring biased toward contact members 45a and 46, its other end 50b being movable in slot 51 for such purposes for reasons presently to be described. The two different portions 50c and 50d, as will be described, are to make contact respectively with the negative electrodes of differently sized cells to be tested.

A movable switch member 52 of springy metallic material is supported in grooves (not shown in detail) in the facing edges of one side wall of the two shell parts. This switch member 52 has switch operating member or button 53 secured thereto and located externally of the casing parts 10 and 11 extending through a hole 53a in the casing parts. The movable end 52a of switch member 52 lies internally of the casing parts 10 and 11 in proximity to the fixed end 50a of contact member 50 so that the normally maintained gap between the ends 50a and 52a may be closed by inward pressure on the externally located button 53 for establishing necessary electric circuits.

One terminal end of the coil D in the core 27 is connected by the wire 55 to the switch member 52. The other terminal end of coil D is connected by wire 56 to the positive or central electrode contact member 45. One terminal end of coil E is also connected by a wire 57 to the said other terminal of coil D and by wire 56 to said positive or central electrode contact member 45. The other terminal end of wire E is connected by a wire 58 to the second positive or central electrode contact member 46.

One terminal end of the coil F is connected by a wire 59 to the bulb contact member 48. The other terminal end of the coil F is connected by a wire 60 to the negative spring contact member 50.

The coil D is of fairly heavy insulated wire. Coil E is of similar wire and has approximately twice the number of turns as coil D. Coil F, on the other hand, is of fine insulated wire and has a much larger number of turns than either coils D or E. Coil D has approximately 15 turns, coil E approximately 35 turns, and coil F approximately 1500 turns.

Calibration of the extent of rotation of disc 39 under action of current flow in coils D, E or F is conveniently provided by a steel calibration plate 65. This plate is supported for pivotal adjustment on the bolt 26 and has a concavely curved edge 66 which is substantially complemental in shape to the curvature of disc 39. A finger member 67 on plate 65 permits rotary adjustment of plate 65 on bolt 26 to change the spacing between edge 66 and the periphery of disc 39. When the core 27 is energized by passage of electric current through one of its coils the plate 65 is magnetized and the relative position of its edge 66 and the disc 39 regulates the extent of magnetic drag on said disc 39 created by the magnetic field emanating from plate 65. This plate 65 can be utilized to counteract the effect of the armature 30 and its part 31 on the deflecting rotation of disc 39 in a calibrating way. Other forms of calibrating devices can be used instead. This calibrating plate 65 is adjusted in its calibrating position during manufacture, and in ordinary usage its position remains unchanged in use of the tester by the consumer.

Figure 6:
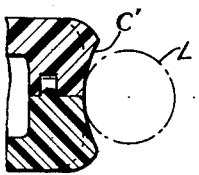
Fig. 6 is a fragmentary section, viewed in the direction of the arrows, taken along line 6—6 of Fig. 4.

The outer surface of the side wall of casing C beyond which the wings 14 and 17 project is made concave at C' (Fig. 6) to accommodate the curvature of the battery or cell used when testing.

*Operation*

Figure 1:
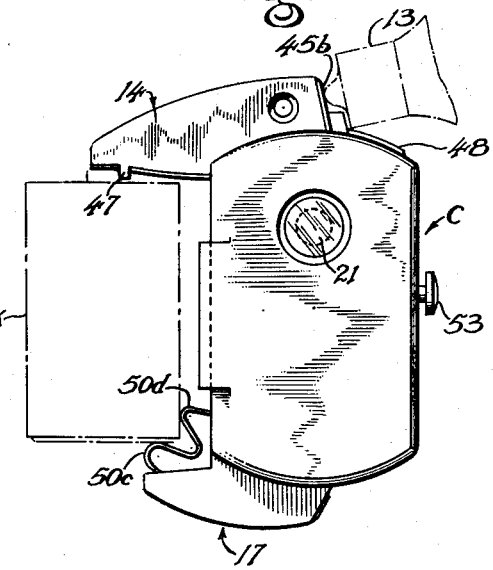
Fig. 1 is a front elevational view of a tester embodying the invention.
Figure 3:
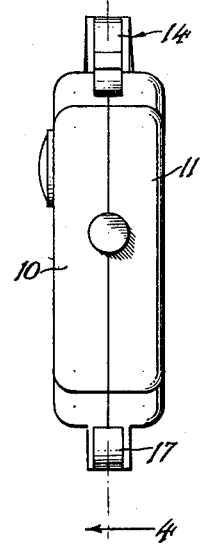
Fig. 3 is a right side elevation of the tester of Fig. 1.
Figure 4:
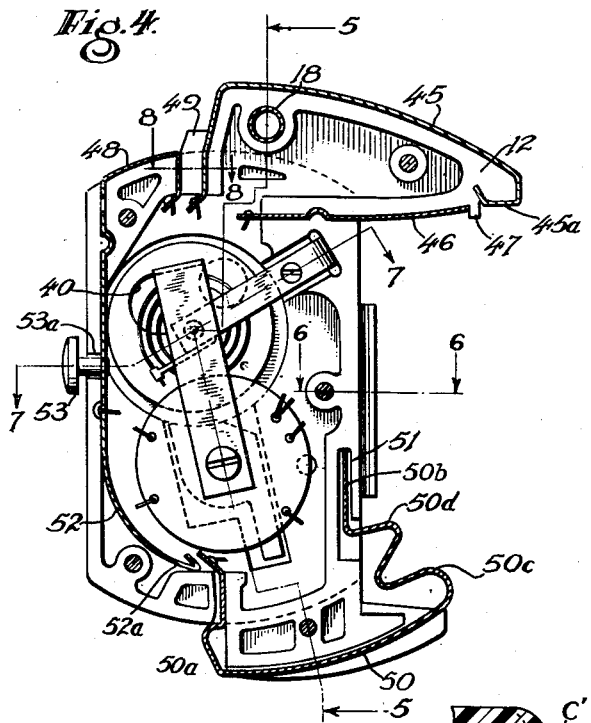
Fig. 4 is a vertical section, viewed in the direction of the arrows, taken along line 4—4 Fig. 3.
Figure 5:
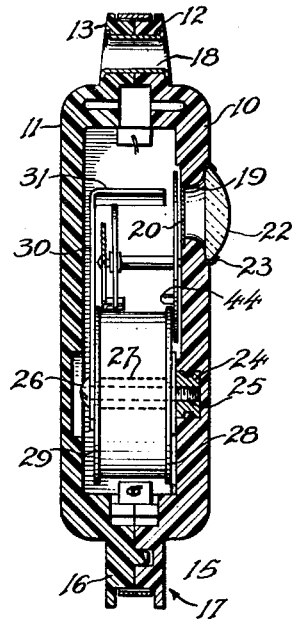
Fig. 5 is a vertical section, viewed in the direction of the arrows taken along line 5—5 of Fig. 4.

To test a standard size "D" cell K (Fig. 1), the cell is positioned in the tester so that its positive or central rod electrode terminal engages the part 45a of the contact member 45, and its negative or zinc can electrode is engaged by the step 50c of spring contact 50. Button 53 is then pressed inwardly to bring switch contact part 52a into contact with the end 50a of spring contact 50 thus completing an electric circuit from the positive terminal of the cell K via contact 45, wire 56, coil D, switch member 52 and contact 50 to the negative zinc can of cell K. Current flowing in coil D energizes the armature 30 and causes disc 39 to rotate against the biasing action of hair spring 41 an amount dependent upon the strength of current flowing in coil D. The tension of hair spring 41 and the calibrator 65 are adjusted as described in manufacture so that if current equivalent to that of a fresh cell flows through the coil D, the radial rotation of disc 39 will be sufficient to bring its lightly colored green area 43 into view through the lens 22 and window 20, the extent of its lightly colored visible area 43 that can be seen through the window 20 being determined by the state of charge of the said cell. The calibration is such that if the charge is of a useful amount, the area of lightly colored portion 43 visible will extend beyond the index marker or indicator line 21 in direction of rotation of disc 39. If the battery charge is low or exhausted the lightly colored green area 43 will not extend as far as said line 21 in the direction of rotation of said disc thereby indicating to the user that the charge in said cell K is too low for further use thereof.

If a smaller type cell "L" is to be tested, its positive or central rod electrode is placed in contact with the contact member 46 and its negative or zinc can electrode in contact with step 50d of spring contact 50. Button 53 is then pressed inwardly to complete an electric circuit from the positive terminal of cell L via contact 46, wire 58, coil E, wire 57, coil D, wire 55, switch member 52 and contact 50 to the negative zinc electrode of cell L. Current flowing in the two coils D and E in series energizes the armature and causes disc 39 to rotate as previously described.

Because the normal charge on cell L is smaller than that of a cell K, the two coils D and E in series are needed to provide a definitely increased total number of effective turns to provide sufficient ampere turns on the core 27 to insure necessary rotation of the disc 39 to give a proper indication of the charge in smaller cell L without need for recalibration of the tension of hair spring 41 or a change of position of calibrator 65. Readings are taken as before. If the lightly colored green area 43 visible through the lens 22 extends beyond the indicator line 21 in the direction of rotation of disc 39, the cell L still has a useful charge, whereas if the lightly colored area 43 does not extend to the line 21, the charge in cell L is too far depleted for further use of the cell under test.

If it is desired to test a bulb such as a flash bulb rather than cells, either a cell K or cell L is positioned between the appropriate contacts of the tester as described. One terminal of the bulb is then placed in contact with a portion 45b of contact member 45 and the other terminal of the bulb B is placed in contact with contact member 48 (see Fig. 1). If the bulb is sound and a cell "K" is used, current flows from the positive terminal of a cell K through contact 45, portion 45b, the bulb, contact 48, wire 59, coil F, wire 60 and contact 50 to the negative terminal of the cell K causing the disc 39 to rotate to bring its colored area 43 into view through lens 22. If the bulb is defective the disc 39 will move proportionately to the amount of resistance encountered in the bulb B. It is so calibrated that reading through window 20 must be all green for a good bulb. Centerline reading means trouble in firing. No green means open circuit in the bulb and that it will not fire or operate.

If a cell L is used rather than a cell K, and the bulb B is sound, current flows from the positive terminal of cell L through contact 46, wire 58, coil E, wire 57, wire 56, portion 45b, the bulb, contact 48, wire 59, coil F, wire 60 and contact 50 to the negative temrinal of cell L causing a similar rotation of disc 39. If the bulb is defective the disc 39 will move proportionately to the amount of resistance encountered in the bulb B. It is so calibrated that the reading through window 20 must be all green for a good bulb. A centerline reading means trouble in firing the bulb. No green means an open circuit in the bulb and that it will not fire or operate.

The arrangement described provides a compact tester for bulbs and differently sized cells which may be carried conveniently by a user in pocket or handbag.

While a specific embodiment of the invention has been disclosed, variations in structural detail within the scope of the claims are possible and are contemplated. There is no intention, therefore, of limitation to the exact details shown and described.

What is claimed is:

1. A battery tester for testing cells of various sizes comprising a casing, an electromagnetically responsive indicator within the casing, coils within the casing adapted to effect movement of the indicator upon passage of electric current through the coils, spaced apart contact members located externally of the casing with which the positive and negative electrodes of cells to be tested may be placed in contact, said contact members including separate ones engageable respectively with the positive electrodes of differently sized cells and an additional single contact member having different portions thereof spaced different distances from said positive electrode engaging contact members and engageable respectively with the negative electrodes of differently sized cells, and means electrically interconnecting two of said coils with said contact members to route current through only one of said coils when a cell contacts the most widely spaced pair of electrode-engaging contact members and contact member portions and to route current through both of said coils in series when a cell contacts the remaining contact members and contact member portions for varying the strength of the magnetic field produced by said coils in relation to the size of the cells contacting said contact members.

2. The tester of claim 1 in which the additional single contact member is spring biased into contacting engagement with the negative electrodes of said differently sized cells.

3. The tester of claim 1 including wings extending laterally of the casing, said wings serving as supports for the externally located contact members.

4. The tester of claim 1 including wings extending from the tester, one of said wings serving as a support for contact members engageable with the positive electrodes of cells to be tested disposing contact portions of said contact members in substantially the same plane but differently spaced outwardly of said casing and the second of said wings serving as a support for the contact member engageable with the negative electrode of such cells, said last named contact member being spring biased toward the positive electrode contact members.

5. A tester for bulbs and batteries of various sizes comprising a casing, an electromagnetically responsive indicator within the casing, a magnetizable core within the casing for actuating the indicator, a plurality of coils on said core, a locating abutment to engage the side of batteries to be tested, a plurality of positive battery electrode-engaging contact members supported by and located externally of said casing, each of said contact members being located to contact the positive electrode of different sized batteries when the batteries engage said locating abutment, and a single negative electrode-engaging contact member in the form of a stepped strip of conductive material having contact portions progressing outwardly from said casing and spaced increasing distances from said positive electrode-engaging contact members, a bulb contact member located externally of said casing in proximity to one of said positive electrode-engaging contact members, manual switch means, circuit means electrically interconnecting one of said coils through said manual switch means with said negative electrode-engaging contact member and the positive electrode-engaging contact member for the largest size battery to be tested, circuit means electrically connecting each of the other positive electrode-engaging contact members through another one of said coils to said first mentioned one of said coils whereby current is routed through said first mentioned one of said coils and another of said coils in series therewith when the positive electrode of a battery engages batteries smaller than the largest battery to be tested, and circuit means for electrically interconnecting one of said coils ebtween said negative electrode contact member and said bulb contact member to produce a magnetic field in said last mentioned coil in accordance with the condition of a bulb in contact with said bulb contact member when the largest size battery to be tested is disposed in engaging relation with the positive and electrode contact members therefor.

6. The tester of claim 5 in which the additional single contact member is spring biased into contacting engagement with the negative electrodes of said differently sized batteries.

7. The tester of claim 5 including calibrating means for regulating the extent of actuation of the indicator.

8. The tester of claim 5 including a reference indicator marking with respect to which said indicator is movable, and calibrating means for regulating the extent of actuation of the indicator in response to passage of electric current through any of the coils.

9. The tester of claim 5 including a window in the casing having a reference indicator marking thereon with respect to which said indicator is movable, a colored area on said indicator visible through said window when the indicator is actuated by passage of electric current through any of the coils, and calibrating means for regulating the extent of actuation of the indicator in response to passage of electric current through any of the coils.

10. The tester of claim 5 including wings extending laterally of the casing, said wings serving as supports from the externally located contact members.

11. The tester of claim 5 including wings extending from the tester, one of said wings serving as a support for contact members engageable with the positive electrodes of batteries to be tested disposing contact portions of said contact members in substantially the same plane but differently spaced outwardly said casing and the second of said wings serving as a support for the contact member engageable with the negative electrode of such batteries, said last named contact member being spring biased toward the positive electrode contact members.

References Cited in the file of this patent

UNITED STATES PATENTS

| | | |
|---|---|---|
| 1,020,541 | Davidson | Mar. 19, 1912 |
| 1,457,597 | Ohmart | June 5, 1923 |
| 2,205,316 | Stratton | June 18, 1940 |

FOREIGN PATENTS

| | | |
|---|---|---|
| 474,078 | Great Britain | Oct. 25, 1937 |